United States Patent
Gaertner et al.

[19]

[11] Patent Number: 6,108,771
[45] Date of Patent: Aug. 22, 2000

[54] REGISTER RENAMING WITH A POOL OF PHYSICAL REGISTERS

[75] Inventors: Ute Gaertner; Klaus Jörg Getzlaff, both of Schönaich; Erwin Pfeffer, Holzgerlingen; Hans-Werner Tast, Weil i.Sch., all of Germany

[73] Assignee: International Business Machines Corporation, Armonk, N.Y.

[21] Appl. No.: 09/015,870

[22] Filed: Jan. 29, 1998

[30] Foreign Application Priority Data

Dec. 19, 1997 [EP] European Pat. Off. ............ 97 122 466

[51] Int. Cl.[7] ....................................... G06F 9/00
[52] U.S. Cl. ............................. 712/217; 712/228
[58] Field of Search ................... 712/217, 228, 712/216

[56] References Cited

U.S. PATENT DOCUMENTS

| | | | |
|---|---|---|---|
| 4,511,964 | 4/1985 | Georg et al. | 711/202 |
| 4,612,612 | 9/1986 | Woffinden et al. | 711/3 |
| 4,638,426 | 1/1987 | Chang et al. | 711/216 |
| 5,828,903 | 10/1998 | Sethuram et al. | 710/53 |
| 5,872,949 | 2/1999 | Kikuta et al. | 712/216 |

*Primary Examiner*—Richard L. Ellis
*Assistant Examiner*—Gautam R. Patel
*Attorney, Agent, or Firm*—Marc A. Ehrlich

[57] ABSTRACT

A system and method for register renaming and allocation in an out-of-order processing system which allows the use of a minimum number of physical registers is described. A link list allows concatenation of a physical register representing a certain instance of the corresponding logical register to the physical register representing the next instance of the same logical register. By adding and removing links in this link list, it is possible to manage the assignment of physical registers to logical registers dynamically. Both the physical registers representing speculative instances and the physical registers representing in-order instances are administrated together. This is done by means of an in-order list, which indicates the physical registers that actually represent the architected state of the machine.

7 Claims, 9 Drawing Sheets

|  |  |  | instances of R3 |  |
|---|---|---|---|---|
| 200 | OR | R2, R3 | R3.7 as source | } (208) |
| 201 | BC | M1, (R1, R2, displ.) |  |  |
| 202 | L | R3, (R4, R3, displ.) | R3.7 as source<br>R3.8 as target | } (209) |
| 203 | A | R3, (R1, R2, displ.) | R3.8 as source<br>R3.9 as target |  |
| 204 | ST | R1, (R4, R3, displ.) | R3.9 as source | } (210) |
| 205 | OR | R3, (R1, R2, displ.) | R3.9 as source<br>R3.10 as target |  |
| 206 | ST | R3, (R3, R3, displ.) | R3.10 as source | } (211) |
| 207 | L | R3, (R4, R3, displ.) | R3.10 as source<br>R3.11 as target |  |
|  |  |  |  | } (212) |

FIG. 2 status of register renaming:

in-order list:

| R0 | 7 |
| R1 | 3 |
| R2 | 10 |
| R3 | 11 |
| R4 | 0 |
| R5 | 2 |
| R6 | 5 |
| R7 | 9 | assignment list:

| R0 | 12 |
| R1 | 3 |
| R2 | 10 |
| R3 | 8 |
| R4 | 0 |
| R5 | 6 |
| R6 | 5 |
| R7 | 9 |

Link List:

| addr. | content |
| 0 | |
| 1 | |
| 2 | |
| 3 | |
| 4 | → 7 |
| 5 | |
| 6 | → 13 |
| 7 | |
| 8 | → 11 |
| 9 | |
| 10 | |
| 11 | |
| 12 | → 4 |
| 13 | → 2 |
| 14 | |
| 15 | | free list:

| 0 | 14 |
| | 1 |
| | 15 |
| | ⋮ |
| 7 | | format of a reservation station entry identifier for S0, S1, A0, A1, T0, T1:

REGISTER RENAMING WITH A POOL OF PHYSICAL REGISTERS

FIELD OF THE INVENTION

The invention is related to register renaming and allocation in a processing system. In particular, the invention provides a method and means for dynamically managing the assignment of physical registers to logical registers.

BACKGROUND OF THE INVENTION

For a long time, processors have executed instructions in their sequential order. This implies that instructions are forwarded to the processor's execution units in the same order as they appear in the program sequence, one after the other.

In such a system, read- and write-operations to any of the processor's registers occur in exactly the same sequence as indicated by the program. Therefore, there exists a one-to-one correspondence between the registers and their values. At any given point in execution, a register identifier precisely identifies the value contained in the corresponding register. This value of a register also represents the actual machine state and can be referred to as the architected register value.

In order to achieve higher instruction throughput, and thus a higher performance, processors that issue, or initiate execution of, multiple independent instructions per clock cycle were introduced. Such processors are known as superscalar processors. Multiple instructions can be executed in a single cycle, as long as there are no data dependencies, procedural dependencies, or resource conflicts. When such dependencies or conflicts exist, only the first instruction in a sequence can be executed. As a result, a plurality of functional units in a superscalar architecture can not be fully utilized.

The next step in the development of high performance processors is to be seen in the introduction of out-of-order processing. Out-of-order processors disobey the instruction sequence when executing a program, and process instructions in a different order than the sequential order.

But if an instruction A produces target data, and said target data is needed by an instruction B as source data, this data dependency has to be taken care of. When instructions are issued out-of-order, correspondence between registers and values breaks down. Several register values corresponding to one logical register may exist in parallel, because each write access to a certain logical register creates a new instance of said register.

The values of different register instances must not be confused. Therefore, register arrays have to be provided that can hold and identify a multitude of values per logical register. Before instructions can be dispatched to any of the execution units, it has to be indicated which instances of the addressed logical registers are to be used. The task of identifying the actual storage cell representing a logical register at a given moment is usually referred to as "register renaming".

A new instance of a certain logical register is created each time a write access to said logical register occurs. Thus, each instruction that modifies any register produces a new physical instance of said register, and for each new instance, a physical register in the register array has to be allocated.

When allocating a new physical register each time a logical register is modified, there also has to exist a mechanism for getting rid of old register instances. Otherwise, the system would accumulate an indefinite amount of register instances. An instance can be destroyed when its value is superseded and there are no outstanding references to said value.

When processing instructions in their sequential order, there always exists a defined "state" of the processor. This defined state must be saved for a program that is suspended, in order to provide for the possibility of "precise interrupts". In case an exception occurs, the processor has to be able to return to said defined state. Also in case a branch has been mispredicted, and several instructions following said branch have speculatively been executed, the processor has to be able to return to a well-defined, non-speculative machine state.

The question arises how said state, and the corresponding architected register values, can be defined in an out-of-order processing system. Even though instructions are processed out-of-order, it is desirable to advance said architected state in order.

One approach for defining an architected in-order state is the following: If an instruction is completed and all previous instructions have also been completed, the instruction's results can be stored as the corresponding register's in-order state, and the instruction can be considered "retired". Thus, the architected state of an out-of-order processing system can be defined by the most recently completed instruction of the continuous string of completed instructions. The corresponding architected register values are the values at the moment said instruction was completed. In case of exceptions, and in case of mispredicted branches, the machine resumes instruction execution at said architected state.

One concept for both being able to handle different register instances, and for continuously advancing said architected in-order state, is the use of a reorder buffer in combination with a register file. When an instruction is decoded, it is assigned an entry at the top of the reorder buffer. Said reorder buffer is implemented as a first-in first-out (FIFO) buffer. When the instruction completes, its result value is written back to the allocated entry. When the value reaches the bottom of the buffer, and if no exception has occurred, it is written to the register file. If the instruction is not complete when it reaches the bottom, the reorder buffer does not advance until the instruction completes. While the speculative values of various register instances are contained in the reorder buffer, the register file holds the architected register values and thus defines the in-order state. In case an exception or a misprediction of a branch occurs, the reorder buffer is discarded and the in-order state is accessed.

One disadvantage of this solution is that register values have to be transferred from said reorder buffer entries to the register file. In case precise interrupt occurs, the values of said register file are accessed.

There exist a variety of different solutions that use a separate register file for holding the architected register values. The temporary values of the different register instances may either be contained, as described, in the reorder buffer, or in the instruction window itself, or in a separate temporary register array. All these solutions have one disadvantage in common: Register values have to be transferred from a temporary register storage—no matter how said storage is implemented—to a register array or a register file holding the architected in-order register values.

In the international application PCT/JP93/00553, "A system and method for retiring instructions in a superscalar microprocessor" to J. Wang, S. Garg and T. Deosaran, a system and method for keeping track both of architected state and rename instances of an out-of-order processing system's logical registers is provided. According to the technique disclosed, results of instructions executed out-of-order are first stored in a temporary buffer, until all previous instructions have been executed.

As soon as all previous instructions have been executed, and their results have been stored in order in a register array, the results of the instruction in question can be written to said register array, and the instruction is considered retired. To maintain the integrity of register array data, results of instructions are not written to the register array until the results of all previous instructions have been written. In this manner, the machine state is updated in sequential order. The solution described comprises means for assigning and writing instruction results to a temporary storage location, for transferring results from temporary storage to the register array, so that the register array is updated in-order, and for accessing both the temporary storage and the register array for subsequent operations.

Again, retiring register values is done by transferring them to a register array which holds the "final register values". A constant data traffic between said temporary register array and said final register array is necessary.

In case the actual value of a certain logical register is to be determined, it first has to be checked whether there exists an instance in said temporary register file. In case there is no temporary instance, said final register array has to be accessed. This data access in two steps requires both time and additional logic.

OBJECT OF THE INVENTION

It is an object of the invention to provide a simple solution for assigning a arbitrary number of physical registers to a certain logical register, while keeping track of the logical register's architected state.

It is another object of the invention to represent the various instances of the logical registers with the minimum number of physical registers.

SUMMARY OF THE INVENTION

The object of the invention is solved by an out-of-order processing system according to claim 1, by a method for allocating physical registers according to claim 6, and by a method for committing physical registers according to claim 8.

A link list is introduced which allows the concatenation of a physical register representing a certain instance of the corresponding logical register with the physical register representing the next instance of the same logical register. By adding and removing links in this link list, it is possible to manage the assignment of physical registers to logical registers dynamically.

At each point in time, only the minimum number of physical registers is assigned to a certain logical register.

On the other hand, if a certain instruction sequence requires a large number of speculative instances for a certain logical register, these additional instances can be created, according to the invention, by simply adding the respective links to the link list.

The link list itself is a small array. Therefore, the amount of extra hardware required is low.

Another advantage of the invention is that both the physical registers representing speculative instances and the physical registers representing in-order instances are administrated together. This is done by means of an in-order list, which indicates the physical registers that actually represent the architected state of the machine.

This architected state is also utilized for recovery after an exception has occurred.

The advantage of administrating speculative instances and in-order instances together is that data transfers between different arrays are not necessary any more. This saves a lot of time.

BRIEF DESCRIPTION OF THE DRAWINGS

FIG. 2 gives a program example, which is to be executed out-of-order. In order to do this, the addressed logical registers have to be renamed to physical registers.

DETAILED DESCRIPTION OF THE INVENTION

Figure 1:
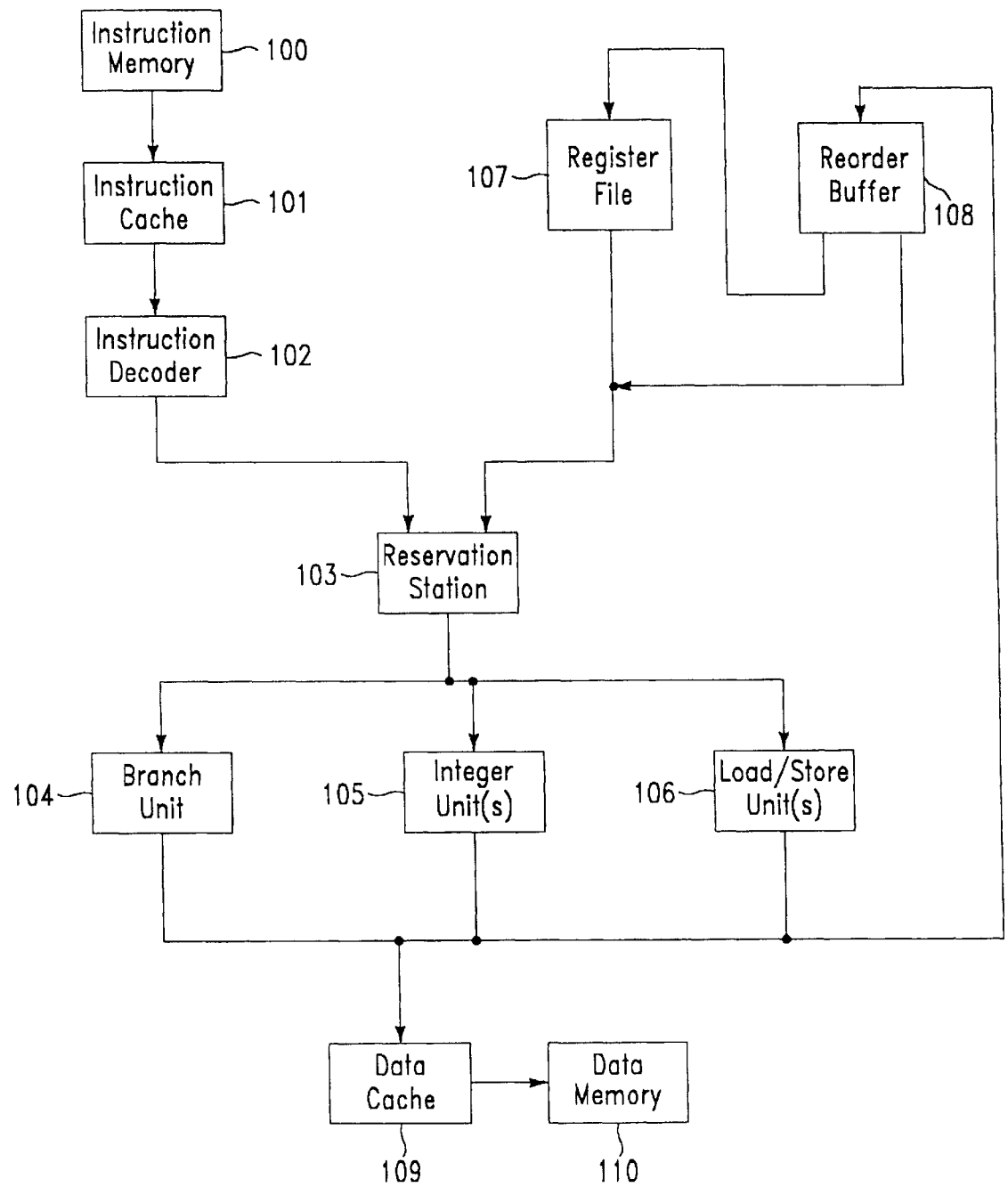
FIG. 1 shows the general structure of an out-of-order processing system.

In FIG. 1, the typical setup of an out-of-order processing system is shown. Instructions are fetched from the instruction memory (100) and buffered in-sequence in the instruction cache (101). Next, the instructions are decoded (102) to a common internal instruction format. There also exist solutions where one external instruction is broken up into a number of small, internal instructions, which can then be processed out-of-order. The instruction decode unit (102) is also responsible for dependency resolution, which means that actual physical storage cells have to be assigned to the logical registers which are used as sources and targets of the respective instructions. At this stage, it is indispensable to keep track of the different instances of each logical register that arise in the course of program execution.

Branch prediction is also performed at the instruction decoding stage.

The instructions are then forwarded to the reservation station (103). For each target register instance of an instruction, an entry is made in the reorder buffer (108). Therefore, the reorder buffer identifies, in the order of occurrence, which is the sequential order, all the physical registers that represent instances of logical registers. In the reservation station, the instructions wait until all the source data they need has been calculated. In case the source data needed by a certain instruction has already been calculated as target data of an earlier instruction, this target data is contained in the register file (107), and can be obtained from there. In case the source data needed by a certain instruction has not been evaluated yet, the instruction has to monitor the results emerging from the different execution units.

In case all the source data of a certain instruction have arrived, the instruction itself can be dispatched to one of the execution units, dependant on its type, and dependant on the availability of execution units. In case of a branch, the instruction has to be dispatched to the branch unit (104), integer arithmetics have to be forwarded to one of the integer units (105), and instructions that access memory have to be dispatched to one of the load/store units (106). Thus, each instruction is processed by the corresponding functional unit, and the instruction's target data can be calculated. In case of a memory access, the load/store unit (106) either writes data to or receives data from a data memory (110) via a data cache (109).

The so-called "commit process" is responsible for retiring instructions, which means that the target register values of said instructions become architected register values. Instruction are always committed in-order. Therefore, the retire pointer, together with the architected register values, defines a precise state of the machine. This machine state is not subject to any changes any more. It advances in sequential order. Therefore, precise interrupts become possible.

When instructions that read from or write to one and the same register are executed, their sequential order has to be maintained. If one does not intend to obey to the requirement of sequential execution, data dependencies between different instructions accessing the same resource have to be resolved first. This is done by assigning different physical registers to the different instances of a resource, such as a logical register. This is called "register renaming" and is one of the essential features of every out-of-order-processing system.

FIG. 2 illustrates this by means of a program example. The occurrence of different instances of register R3 is indicated in the right-hand column of FIG. 2.

In instruction 200 the contents of register R2 and R3 are ORed; the result is written back to register R2. Here, the register R3 (the only one we'll look at) is only used as a source register. Let us therefore call this instance of R3.7, as indicated in the right-hand column.

Next, a "branch on condition" (201) is performed. The condition which determines whether the branch is to be taken or not is contained in register M1. Registers R1 and R2 contain the index and base values, which are used, together with the displacement, to calculate the jump-address. In case the branch is to be taken, program execution continues at the address indicated by R1, R2 and the displacement.

The next instruction (202) is a load operation, which fetches data from memory. R4, R3 and the displacement are used for calculating the respective memory address. The memory content fetched is to be stored to register R3. Thus, R3 is first used as a source operand (for address arithmetic), and then as a target. The register instance used as a source is the same as that used in instruction 200, the instance R3.7. A different instance of R3 has to be assigned to the target of instruction 202, because the load-operation will modify the content of R3. In case the instructions following instruction 202 use R3 as a source, they therefore must not obtain the value of instance R3.7 any longer, because of said modification. For this reason, a new physical instance of register R3, R3.8, has to be allocated for the target of the load operation 202.

In 203, an add operation is performed. Address arithmetic using R1, R2 and a displacement determines an address, and the content of said address is added to the content of R3. The result is stored to R3. Thus, again R3 is first used as a source, and then as a target. As R3 most recently has been modified in instruction 202, the source register value used in instruction 203 has to equal the target register value of instruction 202; it is R2.8. For the target of instruction 203, a new physical register has to be allocated, and a new register instance, R3.9, is assigned to the target of instruction 203.

The store operation 204 stores the content of R1 to an address determined by R4, R3 and a displacement. R3 is used as a source operand in address arithmetic, the instance is R3.9.

Next, in 205, the address determined by R1, R2, and a displacement is accessed, and its content is ORed with the content of register R3. The result of said OR-operation is stored back to R3. The OR-operation's source register instance is R3.9, and R3.10 is assigned to the target.

Instruction 206 stores the content of R3 to a memory address determined by R3 (which is used both as an index and a base) and a displacement. The source register instance used here is R3.10.

In 207, a load access to the address (R4, R3, displacement) occurs, with the result of said load operation being stored to R3. R3 is uses both as a source (for address arithmetic), and as a target. While R3.10 is the instruction's source register instance, R3.11 is allocated as the new target register instance.

When looking at this program sequence, it becomes obvious that in the different segments 208–212 of the instruction stream, different instances of R3 are used. The instructions using R3.10 as a source (206, 207) can only be executed after instance R3.10 has been calculated. This means that instruction 205 has to be executed before either instruction 206 or 207 can be dispatched, but it is of no importance whether instruction 206 or instruction 207 is dispatched first.

The restrictions posed on executing instructions out of their sequential order can be summarized as follows: Whenever a new register instance emerges as the target of an instruction, dispatching instructions which use said register instance as a source register has to be postponed until said register instance has been calculated.

Figure 3:
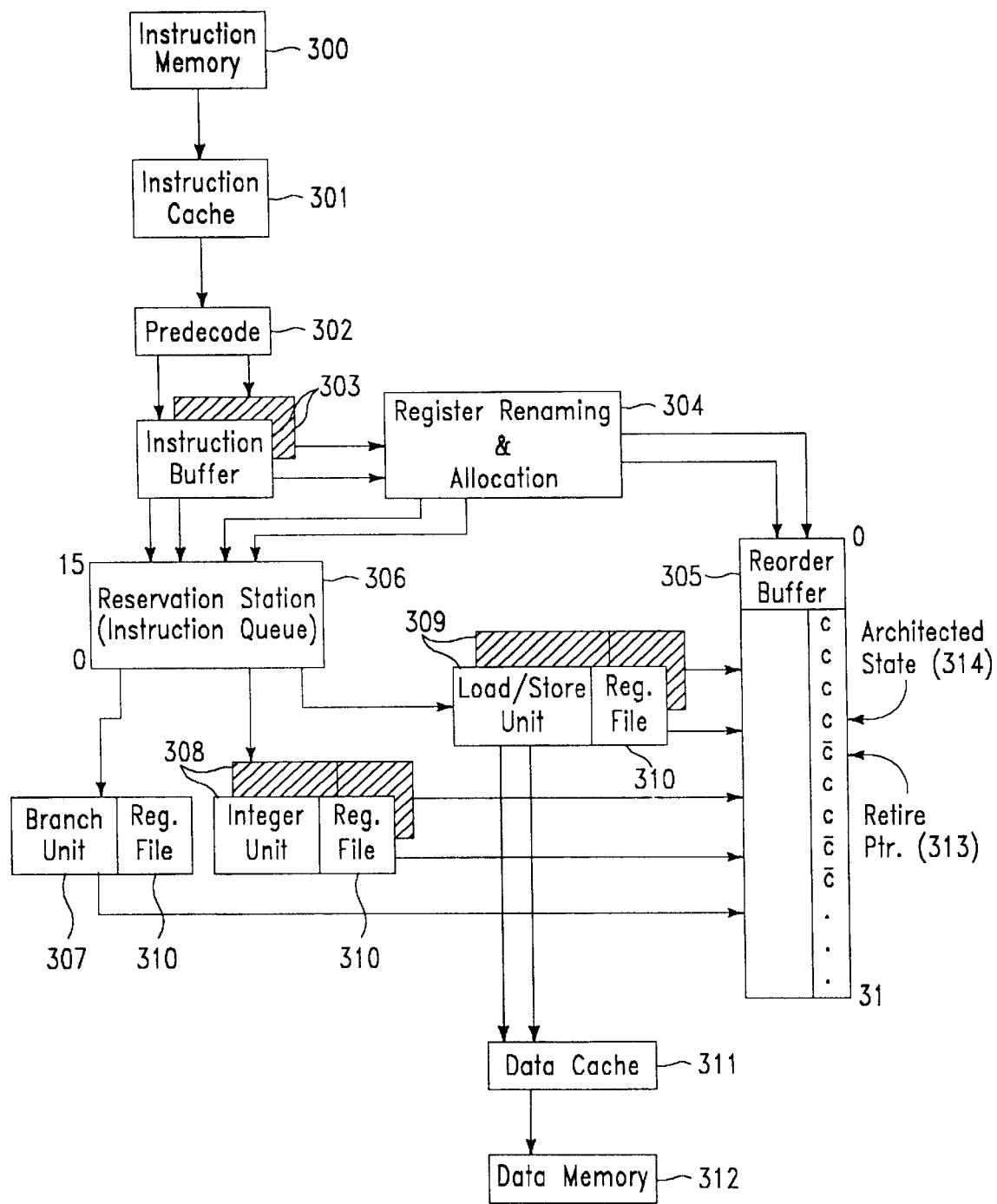
FIG. 3 gives a more detailed view of an out-of-order processing system.

In FIG. 3, a more detailed block diagram of a superscalar computer system is given. Emphasis is put on the handling of the different register instances. As in FIG. 1, instructions that are contained in instruction memory (300) are first transferred to an instruction cache (301). Next, the instructions are forwarded in order to a predecode unit (302), which transforms the instructions of the external instruction stream to a common instruction format suitable for out-of-order processing. In this instruction format, there exist data fields for the OP-code, for at most two source registers, for two registers used for address arithmetic in case the instruction has to access memory, and for at most two target registers.

When looking at the left-hand column of FIG. 2, where an instruction sequence which could be part of an external instruction stream is shown, it becomes obvious that in the external instruction stream, an instruction only references the logical registers that are to be read or modified. The whole problem of the different physical instances that one logical register can have in the course of instruction execution is not solved at this stage. As long as the instructions of the external instruction stream are processed in order, it is not even necessary to consider this problem. But as soon as instructions are executed out of their regular order, it is necessary to carefully keep track of the different physical instances of the same logical register. This is shown for the logical register R3 in the right-hand column of FIG. 2. The problem is solved by assigning one physical register to each instance of a logical register. This means that whenever an instruction modifies a certain logical target register, and thus creates a new instance of said logical register, a new physical register has to be allocated. Whenever this instance of said logical register is used as a source by any other instruction, the same physical register has to be used. As there may exist a multitude of instances of one logical register, there may also exist a multitude of physical registers corresponding to said logical register.

The task of analyzing which physical register corresponds to a logical register used by a certain instruction, replacing said logical register by the appropriate physical register (register renaming), and allocating a new physical register whenever a new instance of any logical register is created (register allocation) is performed by the "register renaming and allocation unit" (304).

Whenever a new physical register is allocated, the "register renaming and allocation unit" (304) also notifies the reorder buffer (305). The reorder buffer holds an entry for each physical target, identifying a certain instance of a certain logical register. Each reorder buffer entry contains the physical register, the logical register it represents, and the completion status of said physical register. In the implementation that will be described, there may exist up to 32 reorder-buffer entries at a given time. Whenever a new physical register is allocated by the "register renaming and allocation unit" (304), a new entry in the reorder buffer (305) is made. As the instructions are still processed in order at the predecode stage, the reorder buffer entries are also made in sequential order, which means that an entry that represents an early instance of a logical register always precedes an entry corresponding to a later instance of the same logical register.

Each reorder buffer entry also contains the completion status of its target register. Of course, when the entry is made, the completion status is "not completed". As soon as a certain register value is evaluated, the completion status of its corresponding reorder buffer entry is changed to "completed". The reorder buffer is realized as a wrap-around buffer; it can contain up to 32 entries.

The instruction buffer (303) contains two instructions of the external instruction stream in a format suitable for the reservation station. The logical registers have been replaced by the appropriate physical registers by the "register renaming and allocation unit" (304), and, whenever a new physical register had to be allocated, an appropriate entry has been made in the reorder buffer (305).

The instructions are now ready to be forwarded to the reservation station (306). The reservation station is implemented as a wrap-around buffer with up to 16 possible entries.

In the reservation station (306), the instructions wait for their source operands. As soon as all the source operands of an instruction have arrived, the instruction signals that it is ready to be dispatched to one of the functional units. Instructions are dispatched to the functional units out of their sequential order, which means that dispatching an instruction is independent of whether the preceding or the following instruction has already been dispatched. Instructions are dispatched to one of the functional units dependent on the type of the instruction: Branches are forwarded to the branch unit (307) integer arithmetics are performed by an integer unit (308), and all instructions that access memory are dispatched to the load/store unit (309). The load/store unit exchanges data with data memory (312) via a data cache (311).

A copy of the register file (310) is attached to each functional unit. When changes are made to any of these register files, the other register files at different functional units are updated. Each register file (310) contains the values of all the physical registers that have been allocated so far.

As each physical register corresponds to an instance of a certain logical register, the register file (310) holds the values of those instances of logical register that have been evaluated so far.

It is advantageous to have a copy of the register file in close proximity to each functional unit. An instruction that has been forwarded to one of the functional units (307, 308, 309) has to access the values of its respective source registers. These register values are contained in the local copy of the register file (310). As soon as result data is produced this result data is written to the local register file. Because the logical source and target registers of an instruction have already been renamed to physical registers at the predecode stage (302), an instruction that is forwarded to a functional unit can directly access the physical source and target registers of the register file, as it is not necessary any more to translate logical to physical registers. This translation has already been done at the predecode stage (302) by the "register renaming and allocation unit" (304). By keeping a local copy of the register file at each functional unit, it is possible to further reduce access time to the contents of registers.

During the commit process, the target register values produced by these instructions become architected register values. Thus, the commit or retire process defines an architected state of the machine. This architected state advances in sequential order from old to more recent instructions, and thereby transforms the corresponding provisional instances of logical registers to valid architected register values.

In order to understand how the commit process works, it is necessary to look at the completion status of the different target register instances stored in the reorder buffer (305). The commit process starts searching for the oldest instruction that has not yet been completed. The retire pointer (313) points to the entry corresponding to said instruction. This instruction can not be retired yet, because its results are not yet available. But all the instructions, and all the corresponding target registers preceding the entry defined by the retire pointer, can be committed. The corresponding instructions are cleared from the reservation station, and the target register values become architected register values. Thus, the architected state (314) is defined by the target register values that precede the reorder buffer entry to which the retire pointer (313) points.

Figure 4:
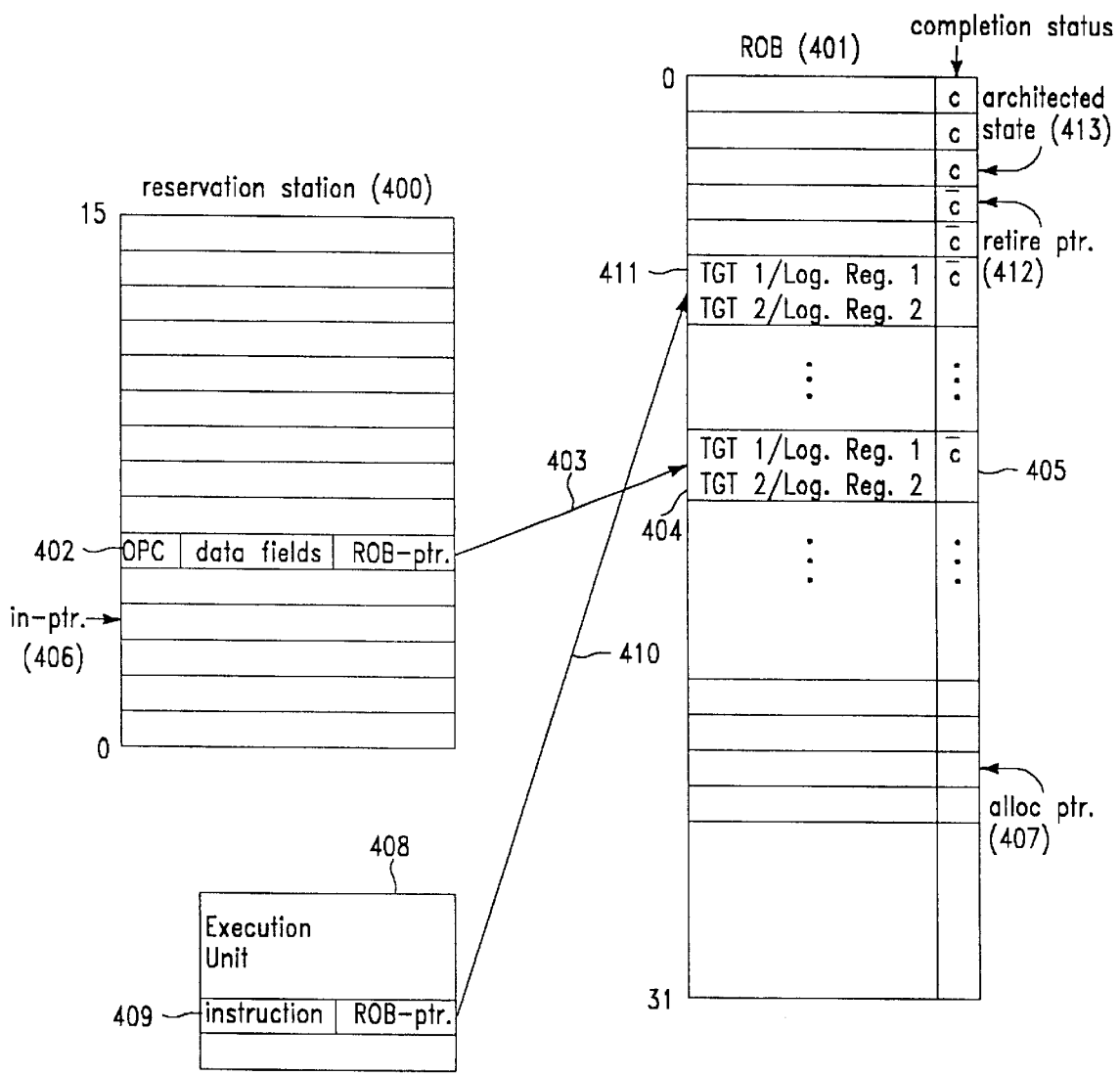
FIG. 4 shows how the reservation station interacts with the reorder buffer, in order to correctly monitor the completion status, and to allow for precise interrupts.

The interplay between the reservation station and the reorder buffer will become more clear when looking at FIG. 4. The reservation station (400) can accommodate up to 16 instructions. One of the reservation station entries (402) is shown. It contains the OP-code of the instruction, data fields for source registers, target registers, and for address calculation. Each instruction can access up to two target registers.

For the target registers that belong to one instruction, an entry in the reorder buffer (401) is made. Each new target register corresponds to a new instance of a certain logical register. Both its physical register and its logical register are identified in the respective reorder buffer entry (404, 411).

The connection between the reservation station entry (402) and the corresponding reorder buffer entry (404), which holds information about the target register or the target registers used by the instruction, is established by the reorder buffer pointer (403). The reorder buffer pointer is part of the reservation station entry (402).

In each reorder buffer entry (404), there further exists a data field (405) which monitors the completion status of the target registers (404) contained in the ROB entry. Initially, a target register's status is "not completed" (405).

As soon as all the source data of a reservation station entry is available, an instruction can be dispatched to one of the execution units (408). In the example of FIG. 4, the instruction 409 is just being processed by the execution unit (408), which means that the instruction is at some stage of the execution unit's pipeline. Together with the instruction, the ROB-pointer (410) has been forwarded to the execution unit (408). Thus, the connection between the instruction (409) and its corresponding entry in the reorder buffer (411) is maintained even during the course of instruction execution.

As soon as the results of instruction execution are available, which is usually at the end of the execution unit's pipeline, the completion status in the ROB changes from "not completed" to "completed". Thus, the reorder buffer (401) contains the identifiers of different instances of the logical registers in their sequential order, and further contains information about whether the value of said register instances has already been evaluated or not.

The reservation station (400) is implemented as an array with wrap-around, with administration being done by means of pointers. Whenever an instruction in its correct format is to be forwarded from the instruction buffer (303) to the reservation station (400), the appropriate entry position is determined by the in-pointer (406). In case the instruction will address one or two target registers, an entry to the reorder buffer will have to be made as well.

The reorder buffer (401) is also implemented as a circular buffer. There exists an allocation pointer (407), which serves as the reorder buffer's in-pointer. It points to the position in the reorder buffer where the next entry is to be made.

While the allocation pointer (407) is necessary to accommodate the targets of new instructions, the retire pointer (412) is necessary for retiring old target register values.

The retire pointer (412) points to the oldest target register that has not yet been completed. The commit process commits the target registers of entries that are older, which means earlier in sequence, than the entry the retire pointer points to. This means that the respective entries are freed and that the target register values become the values of the architected registers, which represent the "official" state of the machine. Executing instructions out-of-order produces a number of provisional instances of logical registers, that might still be subject to changes and purges. But there also exists a precise architected state (413), which is a defined point in the sequential instruction stream, with the architected register values corresponding to said point in the instruction stream.

In the following, a method for allocating and renaming registers will be described, which allows one to flexibly assign physical registers of a pool of physical registers to a logical register, in order to represent different instances of said logical register.

Figure 5:
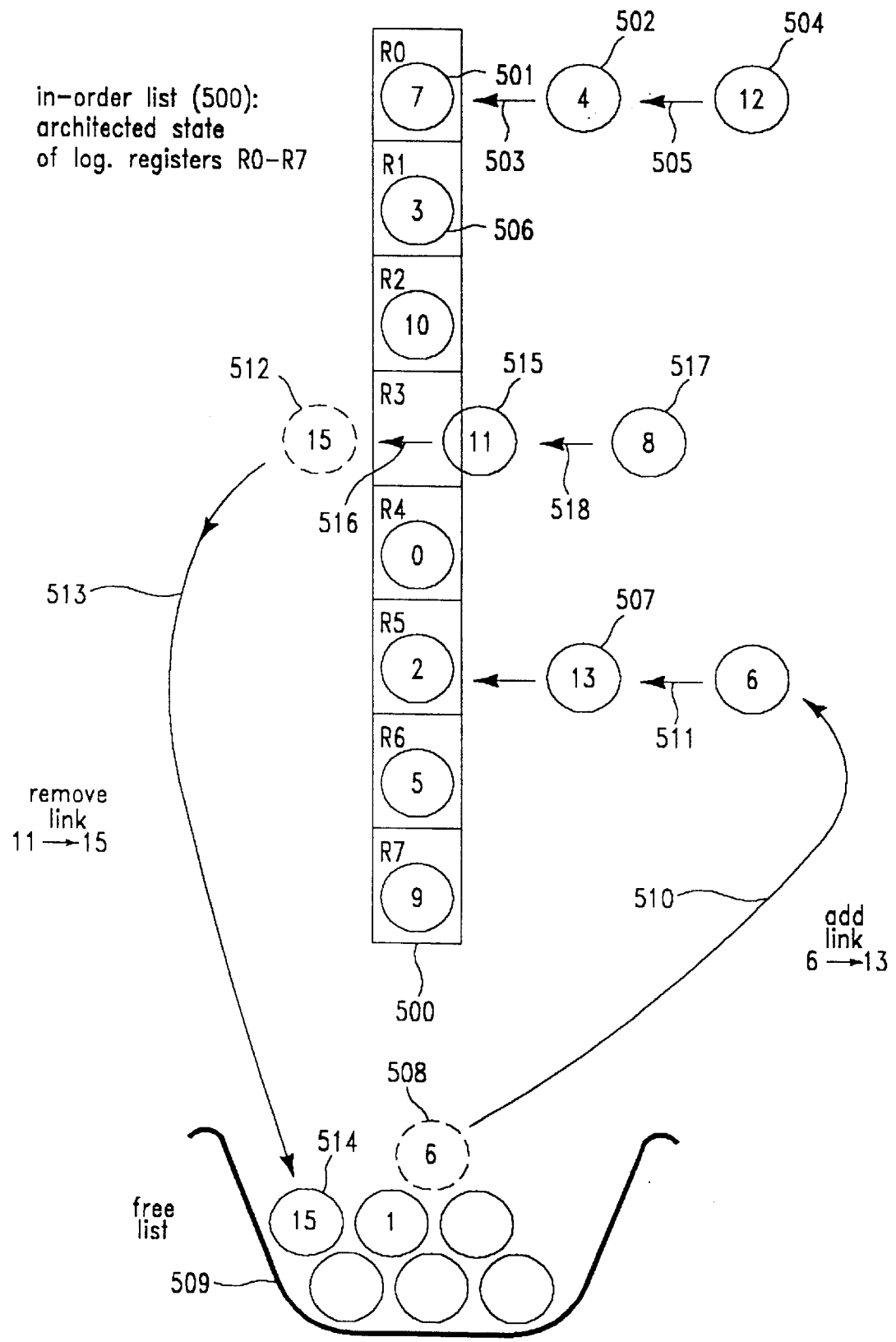
FIG. 5 shows how register instances are created in the allocation process and how they are removed in the commit process.

In FIG. 5, it is shown, according to the method proposed, how these assignments are established and removed. In the example given, there exist 8 logical register R0, R1, . . . R7, which are frequently accessed by the processor to which they belong. The in-order list (500) relates each of the logical registers R0, . . . R7 to the physical register that actually represents the architected state. In FIG. 5, this in-order list (500) is depicted as a column of boxes, whereby the physical registers are illustrated as circled numbers.

For example, the physical register "7" (501) is related to the logical register R0. It is contained in the box 500 representing the in-order list, which implies that the physical register "7" (501) represents the architected state of R0. Accordingly, the physical register "3" (506) is part of the in-order list 500. There exists an entry in the in-order list 500 relating the logical register R1 to the physical register "3" (506), and therefore, the physical register "3" represents the architected state of R1. It has to be noted that at each instant, an architected state of each register has to exist. At each point of time, at least one physical register has to be assigned to each logical register.

At a given instant, there may exist more than one instance of a certain logical register. Of course, each instance has to be represented by a different physical register. Let us have a look at logical register R0 in FIG. 5. There exist three instances of R0, and these instances are represented by the physical registers "7" (501), "4" (502), and "12" (504). As register "7" shows up in the in-order list 500, it represents the architected state. The other two registers "4" (502) and "12" (504) contain values that have not been written back by the commit process yet, and that might still be subject to changes. For example, in case a branch has been mispredicted, corresponding register instances might have to be purged.

The various physical registers representing instances of a certain logical register are concatenated with links (503, 505). The physical register representing a certain instance is linked to the physical register representing the preceding instance of the same logical register. For example, register "4" (502) is linked (503) to register "7" (501), which represents the preceding instance of R0. Accordingly, register "12" (504) is linked (505) to register "4" (502), because register "4" represents a preceding instance of R0.

Whenever an instruction performs a write access to a certain logical register, a new instance of said logical register has to be allocated. As an example, the "add" instruction (203) in FIG. 2 is considered. Said "add" instruction uses the instance R3.8 of logical register R3 as a source, and writes its results to the target register instance R3.9. At this point of the instruction stream, a physical register has to be allocated which furtheron represents the instance R3.9.

As an example, the allocation of a new instance of logical register R5 is shown in FIG. 5. Before said allocation takes place, there exist two instances of R5, represented by the physical register "2" and the physical register "13" (507). Register "2" represents the architected state of R5. Now, a third physical register has to be provided, and this register has to be linked to register "13" (507). Physical registers that are not in use at a certain instant are contained in the free list 509. From there, physical register "6" (508) is fetched (510). Next, it has to be indicated that register "6" represents a new instance of R5. This is done by establishing a link 511 from register "6" to register "13" (507). Concurrently, register "6" (508) is erased from the free list 509.

It is the task of the commit process to advance the architected state of the computer system in the order of the instruction sequence. The architected state of a certain logical register is advanced by removing the physical register that has so far represented the architected state, by removing the link from the succeeding (non-architected)

physical register, and by indicating that said succeeding physical register will furtheron represent the architected state.

As an example, logical register R3 in FIG. 5 will be considered. So far, the architected state of R3 is represented by the physical register "15" (512). As further instructions are retired and as the architected state advances, register "15" (512) is set free (513). An entry is made to the free list 509, in order to indicate that register "15" (514) is not used currently. The first speculative instance of logical register R3 has been represented by physical register "11" (515), which was linked (516) to the former architected state register "15". This link 516 is removed, and register "11" (515) becomes the register representing the architected state. This is indicated in the in-order list 500, where register "15" is replaced by register "11". The link 518, which concatenates the register "8" (517) to the register "11" (515), remains unchanged.

Figure 6A:
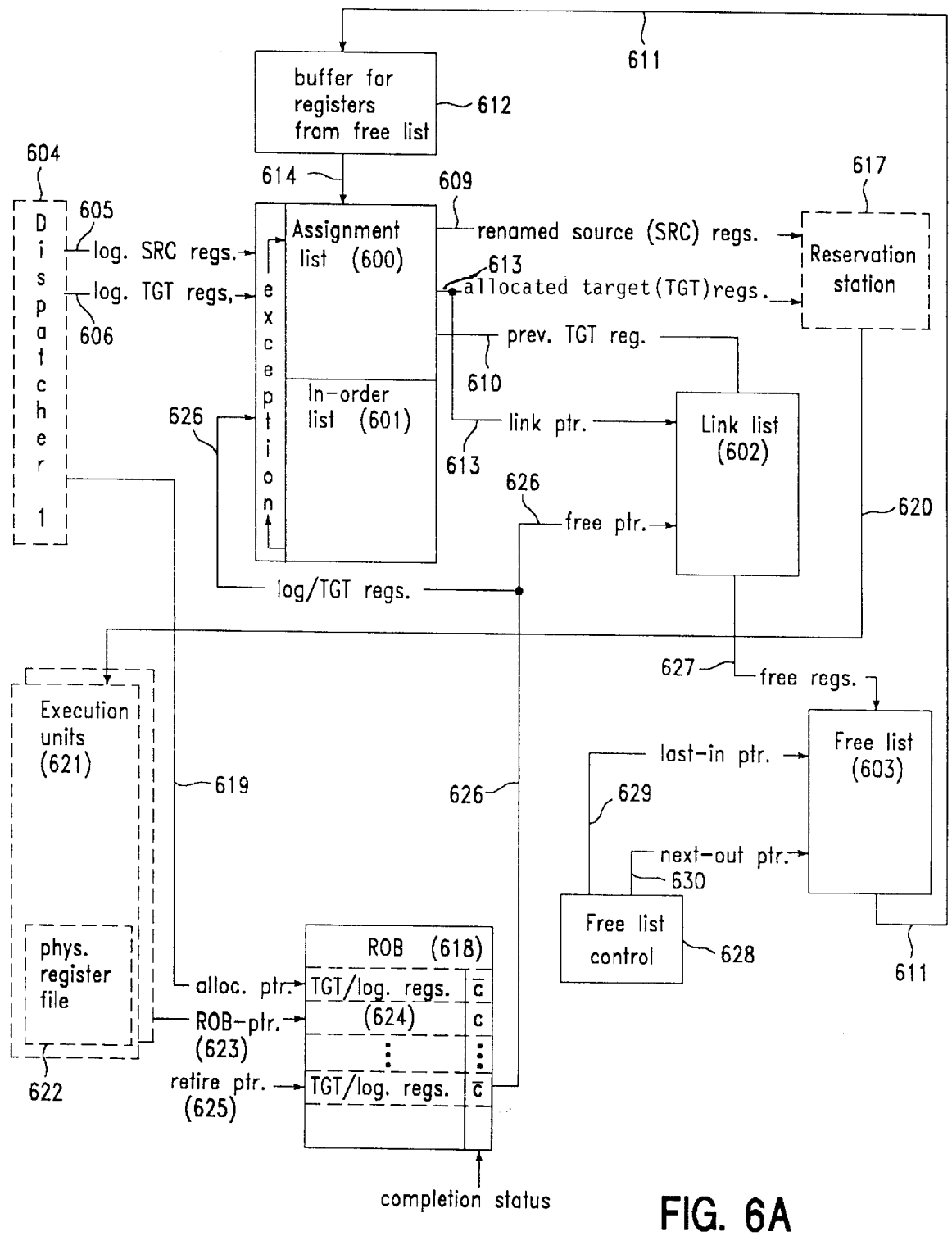
FIG. 6A shows a circuit implementation of the method of FIG. 5 comprising 4 arrays: an assignment list, an in-order list, a link list and a free list.
Figure 6B:
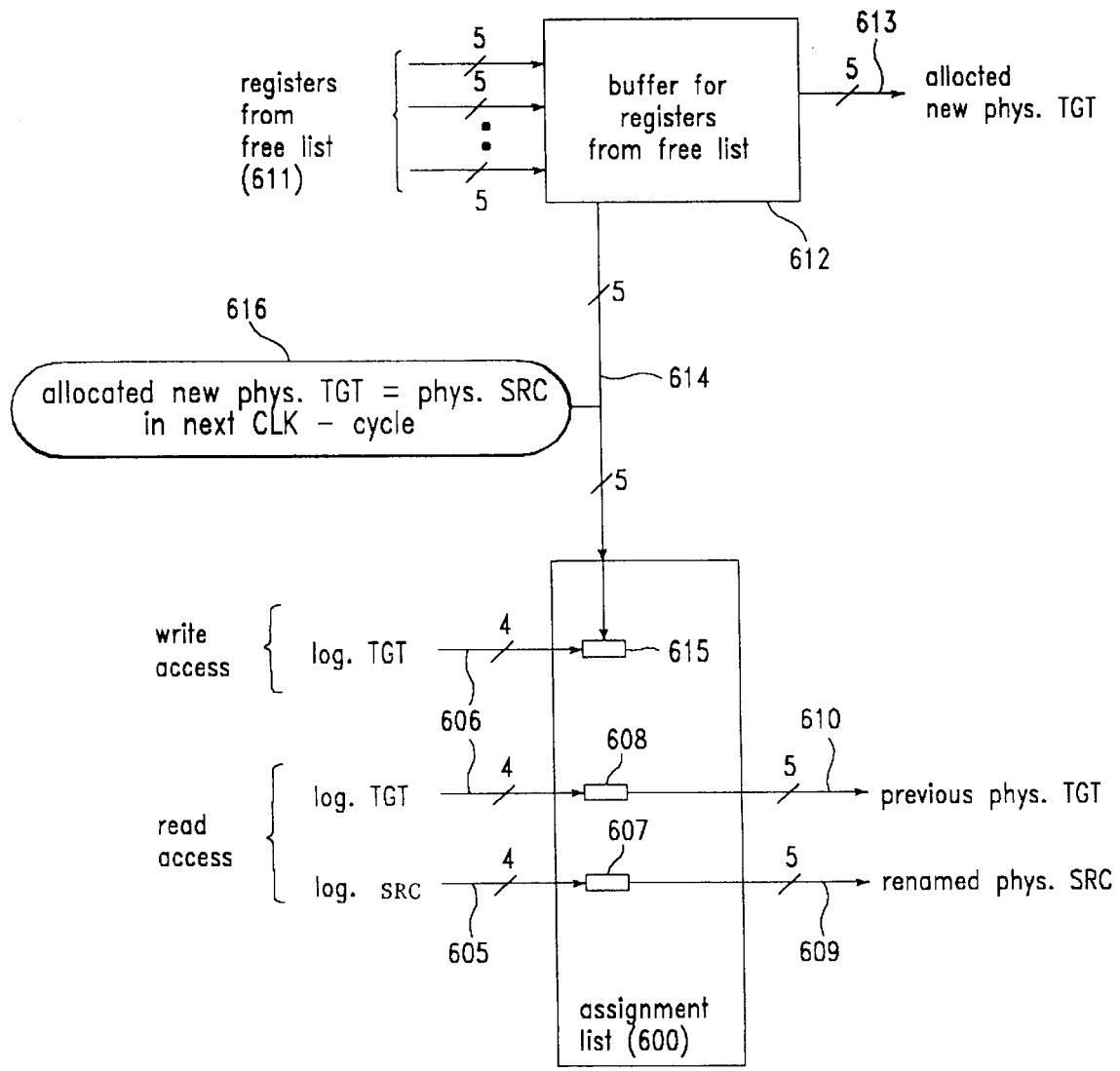
FIG. 6B shows in more detail how register renaming and allocation is performed according to the invention.

In FIGS. 6A and 6B, a circuit comprising several arrays is given. This circuit is an implementation of the method for allocating and renaming registers illustrated in FIG. 5. The in-order list 601 comprises 8 entries and relates each of the logical registers R0, . . . R7 to the physical register representing the architected state. The array 601 therefore is the circuit implementation of "box" 500 in FIG. 5.

Besides the in-order list 601, a second array, the assignment list 600, is provided, which also relates each of the logical registers R0, . . . R7 to a physical register. The assignment list also comprises 8 entries. Each entry indicates the physical register representing the most recently allocated instance of the corresponding logical register.

Links relate a physical register representing a certain instance of a logical register to the physical register representing the preceding instance of the same logical register. The various links (for example links 503, 505, 518 in FIG. 5) are contained in link list 602. The link list is implemented as an array having 16 entries, with each entry relating a first physical register to a second physical register, whereby both physical registers represent the same logical register, and whereby said first physical register was allocated more recently.

All physical registers that are not in use are contained in free list 603, which is the array implementation of free list 509 in FIG. 5. Free list 603 comprises 8 entry positions and therefore, it may contain up to 8 physical registers at a time. This is sufficient, though, because at each instant, at least one physical register has to be assigned to each of the 8 logical registers (in order to represent the architected state). As there exist 16 physical registers, with 8 of said 16 registers being necessary for representing the architected state, there never exist more than 8 unused registers.

Next, it will be discussed how register allocation and renaming actually takes place. Let us assume that there is an instruction at the dispatcher 1 stage (604). The instruction's logical source registers, the logical target registers, and the instruction's OP-code are specified.

The logical source and target registers have to be translated into physical registers, because it's the physical registers that actually are accessed. For this purpose, both the logical source registers and the logical target registers are forwarded (605, 606) to the assignment list 600. The assignment list relates each of the logical registers R0, . . . R7 to the physical register that represents the most recently allocated instance. The logical source register is renamed to said most recently allocated physical register (the current instance of said logical source register) by accessing the corresponding entry in the assignment list 600, and by reading out its content, which is the identifier of the physical register.

This is also shown in FIG. 6B. The task of renaming the logical source register to a physical source register is performed by forwarding (605) the logical source register to the assignment list (600), by performing a read access on the corresponding array entry 607, and by providing (609) the identifier of the renamed physical source register.

For each of the logical target registers provided by an instruction, a new physical register has to be allocated, which will represent a new instance of said logical target register. For this purpose, a "free" physical register has to be used. These "free" registers are contained in free list 603, and from there, they are forwarded (611) to the "buffer for registers from free list" 612. The task of allocating a new physical register for a logical target register is performed by reading out the identifier of a physical register from said "buffer for registers from free list" 612. These physical target registers are then provided (613) as allocated physical target registers. The "buffer for registers from free list" 612 is then filled up again with new "free" registers from free list 603 (611).

Additionally, for each logical target register, a read access to the assignment list entry corresponding to said logical target register (608 in FIG. 6B) is performed. The result of this read access is the previous physical target register, the physical register that has—until now—represented the most recent instance of said logical target register. This previous physical target register will be used (610) for establishing the correct link in link list 602.

As soon as the read access to the assignment list entry corresponding to the logical target is completed, this entry has to be updated. A new physical target register has been allocated (613), and the physical target contained in said entry does no longer represent the latest instance. Instead, the newly allocated physical target register represents the latest instance of the logical target register.

Therefore, a correction is necessary. The identifier of the newly allocated physical register has to be forwarded (614) from the "buffer for registers from free list" (612) to the assignment list 600. There, the identifier of the newly allocated physical register is written to the entry 615 corresponding to the logical target register, because said newly allocated physical register now represents the latest instance of the logical target. Starting with the next clock cycle, the newly allocated physical register can be accessed as a physical source register in the renaming process (616).

When looking back to FIG. 5, the process of allocating a new physical register that is to represent a new instance of a certain logical target corresponds to step 510. So far, physical register "13" (507) has represented the latest instance of R5, and therefore, in the assignment list, "13" is contained in the entry for R5. As soon as a new instruction uses R5 as a logical target register, said instruction might modify the content of R5. Therefore, a new physical register (register "6" in FIG. 5) representing the new instance of R5 has to be allocated. This new physical register is provided from free list 509.

When physical register "6" (508) is concatenated (511) to physical register "13", this has to be indicated in the assignment list (600) as well: Register "13" no longer represents the latest instance of R5, but instead, register "6" represents the latest instance of R5. The entry in the assignment list that has related R5 to "13" has to be changed, it furtheron relates R5 to register "6". In subsequent cycles, whenever logical register R5 occurs as a source register, it will be renamed to physical register "6".

In the following, it will be discussed how the links that concatenate physical registers belonging to a certain logical register are administrated by means of link list 602. A "link", for example link 511 in FIG. 5, connects a physical register representing one instance of a certain logical register to the physical register representing the preceding instance of the same logical register. For example, link 511 connects register "6" to register "13". Whenever a link is established or removed, a corresponding entry in link list 602 is established or removed. At any instant, all the links are represented by corresponding entries in link list 602. A link may start from any of the existing physical registers, and it may connect said physical register to any other physical register.

The link list is structured according to the physical registers from where the link starts. For example, in order to accommodate link 511, one would have to write "13" to entry position "6".

By looking at FIG. 6A, it will become apparent how the link list is updated whenever a new link is established. For this purpose, the newly allocated physical target register 613 is used for addressing an entry position in link list 602. In our example of link 511, link pointer 613 would point to entry position "6". To this entry position, the previous physical target register "13" is written (610). Thus, the connection between the more recent instance, which is used for addressing the link list's entries, and the older instance, which is written to said entry, is established.

For each instruction, an entry in reservation station 617 is made. In this entry, the instruction's source and target operands are specified by the physical registers assigned to them, which are the renamed physical source registers (609), and the allocated physical target registers (613). The physical register file 622, which is part of each of the execution units 621, holds the current values of all the physical registers. In the reservation station 617, it is recorded which of the physical registers have been evaluated so far. The corresponding renamed source registers are indicated as "valid". As soon as all the renamed source registers of an instruction are indicated as "valid", the instruction can be issued (620) to the execution unit 621, where it is executed. A low latency access to the contents of the physical register file 622 is guaranteed by keeping a copy of said register file in close proximity to each execution unit.

For each target operand of an instruction at the dispatcher 1 stage (604), an entry to the reorder buffer 618 is made (619). The entry is made at the position of the ROB to which the allocation pointer points. The structure of the ROB entries (624), the maintenance of the connection between the ROB entry and the corresponding reservation station entry by means of a ROB pointer 623, and the way the completion status of each of the target registers is updated, has already been discussed at FIG. 4. The retire pointer 625 points to the first ROB entry that has not yet been committed. The completion status of this target register is "not completed". As soon as the corresponding instruction has been executed and its results are available, the completion status of said ROB entry changes to "completed". The retire pointer 625 moves to another entry, and the corresponding physical register can be committed.

In FIG. 5, it is shown how the physical register "11" (515) is committed, which means that physical register "11" is indicated as the architected value of R3. Physical register "15", which has so far represented the architected state, is purged. Register "15" is removed from the in-order list 500,
it is put into free list 509. This implies that two arrays, the in-order list 601 and the free list 603, have to be updated.

For this purpose, the physical register that is to be committed (in FIG. 5, this would be register "11") is forwarded (626) to both the in-order list 601 and the link list 602. In the in-order list, the entry of the corresponding logical register is accessed, and the physical "commit" register is written (626) to said entry. In the link list, the links are ordered according to their start register. When addressing the link list with the physical "commit" register 626, the link connecting the "commit" register to a former register instance is selected.

An example will make that clear: If register "11" from FIG. 5 is used for addressing (626) the link list 602, the link 516 connecting register "11" to register "15" will be found. Register "15" represents an instance of R3 that should be deleted. This is done by forwarding (627) the register which is to be deleted (register "15" in case of link 516) to the free list 603.

The free list is implemented as a circular array. The sequence of "free" registers extends from the "last-in pointer" (629) to the "next-out pointer" (630). Whenever a link in the link list is removed and a physical register is set free, said register has to be accommodated in the free list. It is written to the array position adjacent to the one the "last-in pointer" 629 points to. Whenever unused registers have to be provided (611) for the register allocation process, they are read from the array position the "next-out pointer" 630 points to. Said pointer 630 is then moved by one array position. Administration of both pointer 629 and 630 is done by the "free list control" (628).

Figures 7A, 7B, 7C, 7D, 7E:
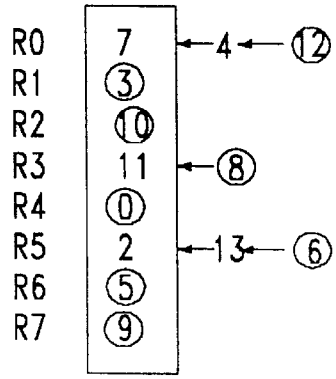
FIG. 7A gives an example of a register status.
FIGS. 7B–FIG. 7E show the contents of the in-order list, the assignment list, the link list and the free list for the register status given in FIG. 7A.

FIG. 7A shows the status of registers of FIG. 5 after register "15" (512), which represents an instance of R3, has been removed, and after register "6", which represents an instance of R5, has been added. Again, links are indicated as arrows pointing from the more recent instance to the older instance. The physical registers contained in the box represent the machine's architected state, and therefore, their identifiers show up in the in-order list, which is given in FIG. 7B. In the in-order list, each logical register R0, . . . R7 is assigned one physical register that represents the architected state.

In FIG. 7A, the physical register representing the most recently allocated instance of a logical register is indicated with a circle. For example, the most recently allocated instance of logical register R0 is represented by physical register "12". In the assignment list in FIG. 7C, each logical register R0, . . . R7 is related to the most recently allocated physical register, which is the respective "circled" register. In some cases, as for logical registers R1, R2, R4, R6 and R7, the most recently allocated physical register also represents the architected state. In other cases, as for logical registers R0, R3, and R5, the most recently assigned instance does not represent the architected state.

FIG. 7D depicts the link list corresponding to the register status given in FIG. 7A. There exist 5 links, with each link relating a more recent instance to an earlier instance of a certain logical register. The link from "4" to "7" is stored at the address "4" of the link list by storing the content "7" to the array position "4". Accordingly, "13" has been stored to position "6", "11" has been stored to "8", etc. In the example given, there exist 8 logical registers, but 16 physical registers. As a link could start from any of said physical registers, 16 entry positions of the link lists have to be provided. Therefore, the addresses in FIG. 7D range from 0 to 15.

Besides the 8 physical registers representing the architected state of the logical registers R0 to R7, 5 more physical registers are actually assigned and represent speculative instances. Therefore, 13 of the 16 physical registers are currently in use, and only 3 physical registers, the registers "14", "1", and "15", are not in use. These three registers form the content of the free list shown in FIG. 7E. The free list may hold up to 8 entries.

Figure 8A:
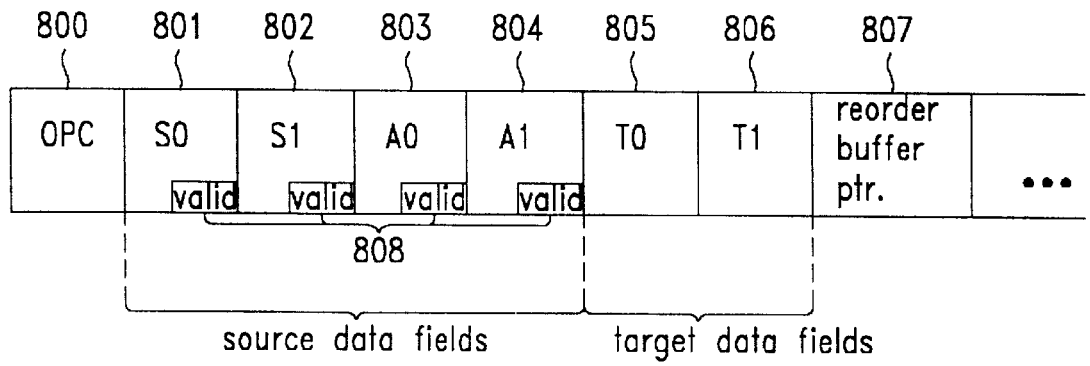
FIG. 8A depicts the format of a reservation station entry.

In FIG. 8A the format of a reservation station entry is shown. Each instruction of the external instruction stream is converted to this format at the predecode stage (302).

In each reservation station entry, there exists a data field for the instruction's OP-code (800). Furtheron, there are 4 source data fields (801, 802, 803, 804) that specify the physical source registers of the instruction. Two of said source data fields, S0 (801) and S1 (802), directly specify operands of the instruction. The data fields A0 (803) and A1 (804) specify physical source registers that are used for address arithmetics (as "index" and "base"). For each of these source data fields, a valid bit (808) indicates whether the content of the corresponding physical register is available or not.

Data produced during execution of the instruction is written to the instruction's target registers. The data fields T0 (805) and T1 (806) specify the physical registers to which results are to be written. As described in FIG. 4, there further exists a reorder buffer pointer (807) in each reservation station entry, which establishes the connection to the corresponding entry in the reorder buffer.

Figure 8B:
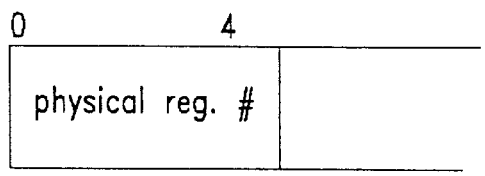
FIG. 8B shows the register identifier for the data fields of a reservation station entry.

It has already been pointed that for accessing contents of physical registers contained in a physical register file, it is only necessary to know the physical register number. As can be seen from FIG. 8B, the identifiers for S0, S1, A0, A1, T0 and T1 only comprise the physical register numbers. Logical register identifiers are not needed for accessing the actual data contained in the physical register file.

Figure 9:
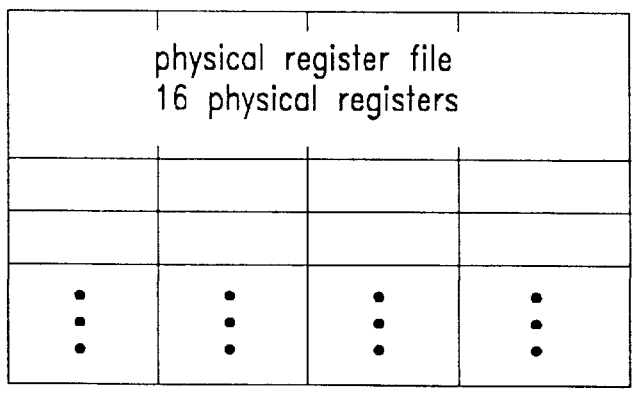
FIG. 9 shows the setup of a physical register file.

In FIG. 9, the physical register file is shown, which comprises data fields for holding the contents of 16 physical registers. Each physical register can be accessed by its physical register number. To allow for a fast access to the data, a copy of this physical register file (622) is maintained at each of the execution units 621.

Although preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the invention defined in the following claims, which should be construed so as to maintain the proper protection for the invention first disclosed.

Having thus describe our invention in detail, what we claim as new and desire to secure by Letters Patent is as follows:

1. An out-of-order processing system which processes instructions out of the sequential order of the instruction stream, said instructions addressing logical registers, said out-of-order processing system comprising:

a physical register array for storing physical registers that represent instances of the logical registers, an in-order list of registers having a plurality of logical register elements, said logical register elements each including a representation of one of said physical registers, said physical register representation corresponding to the architected state of said logical register element in the out-of-order processing system, said in-order list of registers being arranged in the sequential order of the logical registers for directly, sequentially relating each logical register to the physical register representing the architected state of the logical register in the out-of-order processing system, and a link list providing a link between a physical register representing an instance of a logical register and the physical register representing the preceding instance of the same logical register, in order to provide a concatenation of the physical registers according to the order of the corresponding logical register's instances in the instruction stream.

2. An out-of-order processing system according to claim 1, further comprising:

an assignment list of registers having a second plurality of logical register elements, said logical register elements each including a representation of one of said physical registers, said physical register representation corresponding to said logical register element's most recently allocated instance, said assignment list being arranged in the sequential order of the logical registers.

3. An out-of-order processing system according to claim 2 further comprising:

means for exception handling, which copy the contents of said in-order list to said assignment list in case of an exception.

4. An out-of-order processing system according to claim 1, further comprising free list means for keeping physical registers that temporarily do not represent any instance of any logical register.

5. An out-of-order processing system according to claim 1 further comprising:

copies of said physical register array being assigned to each of the functional units of said out-of-order processing system.

6. A method for committing physical registers in an out-of-order processing system, said out-of-order processing system comprising a physical register array for storing physical registers that represent instances of the logical registers, an in-order list of registers having a plurality of logical register elements, said logical register elements each including a representation of one of said physical registers, said physical register representation corresponding to the architected state of said logical register element in the out-of-order processing system, said in-order list of registers being arranged in the sequential order of the logical registers for directly, sequentially relating each logical register to the physical register representing the architected state of the logical register in the out-of-order processing system, and a link list means for providing a link between a physical register representing an instance of a logical register and the physical register representing the former instance of the same logical register, in order to provide a concatenation of the physical registers according to the order of the corresponding logical register's instances in the instruction stream, said method comprising the steps of:
  indicating that a certain physical register has been committed and that the corresponding logical register's architected state is furtheron represented by said committed physical register;
  updating said in-order list by including in one of said logical register elements a representation of said committed physical register; and
  removing from said link list, the link between the physical register that had previously represented the architected state and said committed register which now represents the corresponding logical register's architected state.

7. A method for allocating physical registers in an out-of-order processing system according to claim 6,
  said out-of-order processing system further comprising
    free list means for keeping physical registers that temporarily do not represent any instance of any logical register;
  said method further comprising the step of
    adding, to said free list means, the physical register that has so far represented the architected state.

* * * * *